(12) United States Patent
Liao

(10) Patent No.: US 6,737,448 B2
(45) Date of Patent: May 18, 2004

(54) HIGH REFRACTIVE INDEX, OPTICALLY CLEAR AND SOFT HYDROPHOBIC ACRYLAMIDE COPOLYMERS

(75) Inventor: Xiugao Liao, Irvine, CA (US)

(73) Assignee: Staar Surgical Company, Monrovia, CA (US)

( * ) Notice: Subject to any disclaimer, the term of this patent is extended or adjusted under 35 U.S.C. 154(b) by 0 days.

(21) Appl. No.: 10/161,030

(22) Filed: Jun. 3, 2002

(65) Prior Publication Data

US 2003/0225181 A1 Dec. 4, 2003

(51) Int. Cl.$^7$ ............... G02C 7/02; C08F 220/70
(52) U.S. Cl. .............. 523/106; 526/227; 526/305; 525/329.4; 525/937; 351/159; 351/160 R
(58) Field of Search ............ 523/106; 526/227, 526/305; 525/329.4, 937; 351/159, 160 R

(56) References Cited

U.S. PATENT DOCUMENTS

| | | |
|---|---|---|
| 4,834,750 A | 5/1989 | Gupta |
| 5,217,491 A | 6/1993 | Vanderbilt |
| 5,290,892 A | 3/1994 | Namdaran et al. |
| 5,359,021 A | 10/1994 | Weinschenk, III et al. |
| 5,603,774 A | 2/1997 | LeBoeuf et al. |
| 5,674,960 A | 10/1997 | Namdaran et al. |
| 5,693,095 A | 12/1997 | Freeman et al. |
| 5,814,680 A | 9/1998 | Imafuku et al. |
| 5,843,186 A | 12/1998 | Christ |
| 5,861,031 A | 1/1999 | Namdaran et al. |
| 5,882,421 A | 3/1999 | LeBoeuf et al. |
| 5,922,821 A | 7/1999 | LeBoeuf et al. |
| 6,036,891 A * | 3/2000 | Liao et al. ........... 252/588 |
| 6,203,973 B1 * | 3/2001 | Chen et al. ........... 430/627 |
| 6,241,766 B1 | 6/2001 | Liao et al. |
| 6,245,106 B1 | 6/2001 | Makker et al. |
| 6,271,281 B1 | 8/2001 | Liao et al. |

FOREIGN PATENT DOCUMENTS

| | | |
|---|---|---|
| EP | 0 485 197 B1 | 5/1992 |
| EP | 0 485 197 A1 | 5/1992 |
| WO | WO 94/25510 | 11/1994 |
| WO | WO 96/40303 | 12/1996 |

* cited by examiner

Primary Examiner—Tae H. Yoon
(74) Attorney, Agent, or Firm—Fulwider Patton Lee & Utecht, LLP

(57) ABSTRACT

High refractive index, optically clear and soft hydrophobic acrylamide copolymers and ophthalmic lenses made therefrom are provided. The copolymers are comprised of a hydrophobic acrylamide monomer of N-Benzyl-N-isopropylacrylamide and at least one monomer of an alkyl acrylate and/or alkyl methacrylate. The copolymers and ophthalmic lenses of the present invention are hydrophobic and soft, with a low glass transition temperature (Tg) and a high refractive index.

36 Claims, 2 Drawing Sheets

HIGH REFRACTIVE INDEX, OPTICALLY CLEAR AND SOFT HYDROPHOBIC ACRYLAMIDE COPOLYMERS

FIELD OF THE INVENTION

The present invention is directed to high refractive index, optically clear and soft copolymers, and ophthalmic lenses formed therefrom. More particularly, the invention relates to a copolymer having as a first constituent a hydrophobic acrylamide monomer.

BACKGROUND OF THE INVENTION

The physiology of the human eye includes an anterior chamber located between the cornea, or outer surface of the clear part of the eye, and the iris, the pigmented portion of the eye that is responsive to light, and a posterior chamber, filled with vitreous humor. A crystalline lens, which includes a lens matrix contained within a capsular bag, is located behind the iris and separates the iris from the posterior chamber. The crystalline lens is attached to the ciliary muscle by cord-like structures called zonules. Lining the rear of the posterior chamber is the retina, the light sensing organ of the eye, that is an extension of the optic nerve. In young, healthy eyes, contraction and relaxation of the ciliary muscle shapes the natural crystalline lens to the appropriate optical configuration for focusing light rays entering the eye on the retina.

As the natural crystalline lens ages, however, the structure of the lens matrix of the crystalline lens changes, becoming hazy and relatively inflexible. Eventually, the hazing of the lens matrix may progress to the point where the lens is considered cataractous, which may seriously occlude the amount of light passing through the crystalline lens and ultimately onto the retina. Fortunately, modern surgical techniques have been developed which allow removal of the cataractous lens matrix so that light may once again pass unimpeded onto the retina.

Presently, a cataractous crystalline lens matrix is removed from an eye using a procedure whereby the cataractous natural lens matrix is extracted from the capsular bag of the lens through an anterior capsulotomy. Typically, the cataractous lens matrix is removed from the capsular bag through the anterior capsulotomy using phacoemulsification and aspiration. Alternatively, the cataractous lens matrix may be removed using several other well known techniques whereby the cataractous material is broken up and aspirated from the capsular bag. After extraction of the cataractous lens matrix, an intraocular lens may be implanted within the remaining capsular bag. However, while the procedure to remove the emulsified natural lens can be accomplished with about a three millimeter incision in the cornea, about a six millimeter incision is required to accommodate the full diameter of the intraocular lens to be implanted.

In order to reduce the size of the incision required for implantation of an intraocular lens, and thus limit the trauma to the eye, intraocular lenses made of relatively soft material that can be rolled, folded or otherwise deformed for insertion into the eye were developed, replacing conventional intraocular lenses made of relatively hard material, such as polymethylmethacrylate (PMMA). Soft intraocular lenses have typically been made from hydrogel, silicone, or acrylic material. Intraocular lenses made from hydrogel and silicone typically have a relatively low refractive index, requiring a thicker lens. Further, while silicone lens material has a low glass transition temperature (lower than $-100°$ C.), it unfolds quickly in the eye, risking damage to eye tissue. Acrylic material has been found to have a relatively high refractive index and unfold in a slower amount of time. However, most acrylic lens materials have relatively high glass transition temperatures at about room temperature. Therefore, further improvements in the properties of acrylic lens materials would be desirable.

It would be desirable to provide an acrylic material with a higher refractive index than conventional silicone and hydrogel materials to permit the lens to be much thinner and thus have more controllable folding release. Also, it would be desirable to provide an acrylic material with a lower glass transition temperature than conventional acrylic materials such that it can be folded at lower temperatures.

What has been needed and heretofore unavailable, is an acrylic material having improved properties, including a high refractive index and low glass transition temperature, for use in intraocular lenses. The present invention satisfies these needs and others.

SUMMARY OF THE INVENTION

The present invention provides a soft hydrophobic acrylamide copolymer useful in the fabrication of ophthalmic lenses, including intraocular lenses and other implantable ocular devices, such as intraocular contact lenses. The hydrophobic acrylamide copolymer has a water content of less than about 1 percent by weight.

In one embodiment, the soft hydrophobic acrylamide copolymer comprises a first constituent that is a hydrophobic acrylamide monomer. The hydrophobic acrylamide monomer may be N-benzyl-N-isopropylacrylamide (BPA) which may be present in an amount of about 5 to about 50 percent by weight of the copolymer, and more particularly, about 12 to about 25 percent by weight of the copolymer.

In another embodiment, the copolymer also includes a second constituent that forms copolymers having a glass transition temperature (Tg) of less than about $22°$ C. This constituent may consist of alkyl acrylate or methacrylate monomers or mixtures thereof. In one embodiment, the second constituent is n-butyl acrylate. In another embodiment, it is a mixture of n-butyl acrylate and n-butyl methacrylate. In yet another embodiment, the second constituent is a mixture of n-butyl acrylate and ethyl methacrylate.

In still another embodiment, the copolymer includes a crosslinking agent, such as ethylene glycol diacrylate, ethylene glycol dimethacrylate, 1,3-butanediol diacrylate, 1,3-butanediol dimethacrylate, 1,4-butanediol diacrylate, 1,4-butanediol dimethacrylate, 1,6-hexanediol diacrylate, 1,6-hexanediol dimethacrylate, poly(ethylene glycol)diacrylate, poly(ethylene glycol)dimethacrylate. In one embodiment, ethylene glycol dimethacrylate is used as the crosslinking agent.

In yet another embodiment, an ultraviolet (UV) light absorbing constituent, such as acrylate or methacrylate functionalized benzotriazoles and benzophenones, is also included in the copolymer. An initiating constituent, such as peroxide, peroxydicarbonate, azo free radical initiators, and UV initiators may also be included.

The copolymers of the present invention have a high refractive index, at least about 1.47 (at $20°$ C.) in one embodiment. The glass transition temperature (Tg) of the copolymers is also low, being at most about $5°$ C. in one embodiment.

In one embodiment, an ophthalmic lens is formed from the soft hydrophobic acrylamide copolymer. In particular, the ophthalmic lens may be an intraocular lens. The ophthalmic lens may also be an intraocular contact lens or other implantable ocular device.

The copolymers of the present invention are particularly suited for use in ophthalmic lenses due to their high refractive index and optical clarity. The copolymers are also soft materials with low glass transition temperatures, permitting lenses formed therefrom to be deformed for insertion at lower temperatures. The copolymers also have high strength and flexibility. They are also photostable and Yttrium Aluminum Garnet (YAG) laser stable.

Other features and advantages of the invention will become apparent from the following detailed description, taken in conjunction with the drawings, which illustrate, by way of example, various embodiments, principles and features of the invention.

DETAILED DESCRIPTION OF THE PREFERRED EMBODIMENTS

Figure 1A:
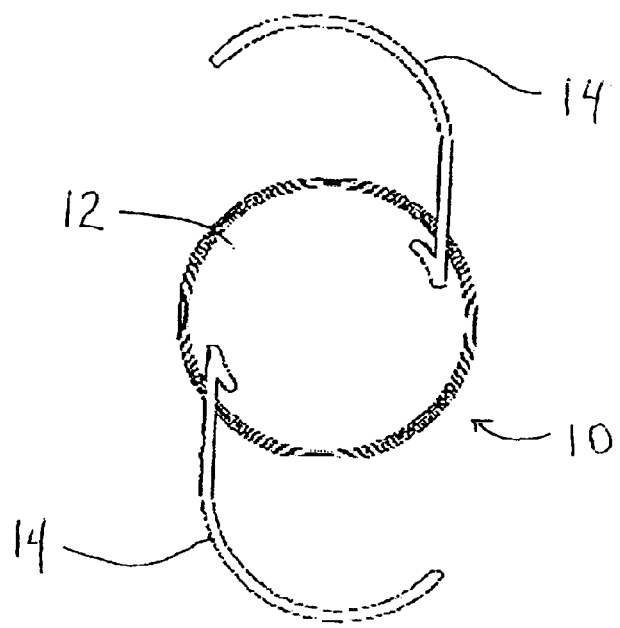
FIG. 1A is a top view of an embodiment of an intraocular lens of the present invention, having an optic and a pair of haptics.

The present invention relates to copolymers having a high refractive index and optical clarity, and ophthalmic lenses made therefrom. Specifically, the invention relates to soft hydrophobic acrylamide copolymers having high refractive index and optical clarity that are suitable for implantation within an eye of a patient.

The copolymers of the present invention include as a first constituent a hydrophobic acrylamide monomer. In one embodiment, the hydrophobic acrylamide monomer is N-benzyl-N-isopropylacrylamide (BPA). The BPA monomer is present in an amount of about 5 to about 50 percent by weight of the copolymer in one embodiment and about 12 to 25 percent by weight in another embodiment.

The copolymers of the present invention also include a second constituent that forms copolymers having glass transition temperatures of less than about 22° C. In one embodiment, the second constituent is selected from acrylate monomers, methacrylate monomers and mixtures thereof. The acrylate or methacrylate monomers used in this invention include alkyl acrylates or alkyl methacrylates. Examples of suitable alkyl acrylates and alkyl methacrylates include, but are not limited to, n-butyl acrylate, ethyl acrylate, ethyl methacrylate, methyl acrylate, methacrylate, n-propyl acrylate, n-propyl methacrylate, iso-propyl acrylate, iso-propyl methacrylate, n-pentyl acrylate, n-pentyl methacrylate, iso-pentyl acrylate, iso-pentyl methacrylate, s-butyl acrylate, s-butyl methacrylate, s-pentyl acrylate, s-pentyl methacrylate, n-hexyl acrylate, n-hexyl methacrylate, iso-hexyl acrylate, iso-hexyl methacrylate, n-octyl acrylate, n-octyl methacrylate, iso-octyl acrylate, iso-octyl methacrylate, 2-ethylhexyl acrylate, 2-ethylhexyl methacrylate, stearyl acrylate, stearyl methacrylate, n-dodyl acrylate, n-dodyl methacrylate, phenylethyl acrylate, phenylethyl methacrylate, and so on. In one embodiment, the second constituent is n-butyl acrylate. In another embodiment, the second constituent is a mixture of n-butyl acrylate and n-butyl methacrylate. In yet another embodiment, the second constituent is a mixture of n-butyl acrylate and ethyl methacrylate. More particularly, the second constituent may include an amount of n-butyl acrylate that is about twice the amount by weight of ethyl methacrylate. In one embodiment, the first and second constituents together makeup about 90 percent or more by weight of the copolymer.

As used herein, the term "hydrophobic" copolymer refers to copolymers which do not associate with substantial amounts of water and have less than about 1 percent water content. Likewise, the term "hydrophobic" monomer refers to monomers which form homopolymers which do not associate with substantial amounts of water and have less than about 1 percent water content.

In one embodiment, the copolymer includes a crosslinking agent as a third constituent. Suitable crosslinking agents include, but are not limited to, ethylene glycol diacrylate, ethylene glycol dimethacrylate, 1,3-butanediol diacrylate, 1,3-butanediol dimethacrylate, 1,4-butanediol diacrylate, 1,4-butanediol dimethacrylate, 1,6-hexanediol diacrylate, 1,6-hexanediol dimethacrylate, poly(ethylene glycol) diacrylate, poly(ethylene glycol)dimethacrylate. In one embodiment, ethylene glycol dimethacrylate is used as the crosslinking agent. The crosslinking agent is generally present in an amount of less than about 10 percent by weight of the copolymer. In one embodiment, the crosslinking agent is present in an amount of about 2 to about 8 percent by weight of the copolymer.

The copolymers of the invention may also include additional constituents. For example, an ultraviolet (UV) light absorbing constituent, such as acrylate or methacrylate functionalized benzotriazoles and benzophenones, may be used. In one embodiment, the WV absorbing constituent is a benzotriazole such as 2-[3-(2H-Benzotriazol-2-yl)-4-hydroxyphenyl]ethyl methacrylate. Use of this UV absorbing constituent provides UV cut off of 10 percent at least at 350 nm in the resulting copolymer. The UV absorbing constituent is usually present in an amount of about 0.05 to about 5 percent by weight of the copolymer.

Additionally, the copolymers may additionally include an initiating constituent to initiate polymerization. Examples of suitable initiating constituents include, but are not limited to, peroxide, peroxydicarbonate, azo free radical initiators, and UV initiators such as Irgacure® 1850, Irgacure® 369 and Darocure® 1700 available from Ciba Specialty Chemicals, Basel, Switzerland. In one embodiment, an azo free radical initiator, such as 2,2'-azobisisobutyronitrile, is used. The initiating constituent is usually present in an amount of about 0.05 to about 5 percent by weight of the copolymer. Gamma-radiation may also be used as an initiator.

The preparation of the BPA monomer may be performed by conventional means. For example, N-benzyl-N-isopropylamine and acryloyl chloride may be reacted in ethyl ether in the presence of triethylamine at 0° C. to 25° C.

The copolymers may also be prepared by conventional means. Generally, the constituents are mixed and purged with nitrogen. Then, the mixture is transferred into a sheet-casting fixture and heated to about 60° C. to about 120° C. for at least about 10 hours. In one example, the mixture is heated at about 70° C. to about 90° C. for about 16 hours. The mixture is finally post-cured at about 120° C. or higher for at least about two hours, and more particularly, at about 140° C. to about 145° C. for about 4 to about 6 hours.

The resulting copolymers are soft, hydrophobic, biocompatible and optically clear. Further, they have an elongation that exceeds 80 percent and a high tensile strength. The copolymers of the present invention have a high refractive index, typically at least about 1.47 (at 20° C.). The glass transition temperature (Tg) of the copolymers is also low, being less than room temperature. In one embodiment, glass transition temperature (Tg) is at most about 5° C.

The copolymers are particularly useful in the fabrication of ophthalmic lenses and other implantable ocular devices, including intraocular lenses and intraocular contact lenses. The copolymers may be advantageously used for the lens body of the ophthalmic lens, or more particularly the optic of an intraocular lens. The copolymers are soft, biocompatible, and optically clear and have a high refractive index and high strength. They are capable of being deformed for insertion through a small incision in the cornea without breakage and regain their shape in a suitable amount of time. The copolymers are also YAG-laser stable and photostable.

The ophthalmic lens bodies may be formed from the crosslinked copolymer sheet by any suitable mechanical method, such as by cutting the sheet into buttons and cryogenically lathing the buttons into ophthalmic lens bodies such as intraocular lens optics. Alternatively, instead of sheet casting, the soft hydrophobic acrylamide copolymer may be molded and lens bodies may be cut or lathed from the lens mold. In yet another embodiment, the lens mold may be shaped so as to produce a lens having suitable curves and geometry such that the molded lens requires little or no additional forming to provide a finished lens.

Figure 1B:
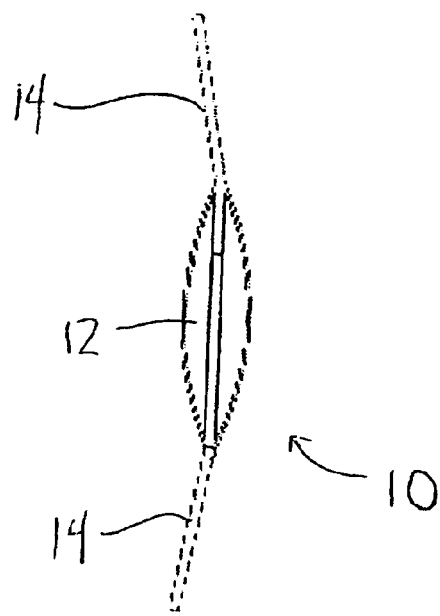
FIG. 1B is a side view of the embodiment of FIG. 1.

FIG. 1A depicts an embodiment of an intraocular lens 10 of the present invention. The intraocular lens 10 has an optic 12 formed from a copolymer of the present invention and flexible haptics 14 for positioning the intraocular lens 10 in the eye. The intraocular lens 10 may have one or more haptics, although in this embodiment, two haptics 14 are shown. Also, in this embodiment, the intraocular lens 10 is shown as a multi-piece lens wherein the optic 12 and the haptics 14 are formed from different materials and the haptics 14 are attached to the optic 12 by conventional methods. The haptics 14 may be, for example, a filament of PMMA, polyimide, Kynar® or polypropylene formed by extrusion. As one skilled in the art will appreciate, the intraocular lens may alternatively be a one-piece design wherein the optic and haptics are formed from a single piece of the copolymer of the present invention. FIG. 1B depicts a side view of the intraocular lens 10 of FIG. 1A, further showing the optic 12 and haptics 14.

Figure 2B:
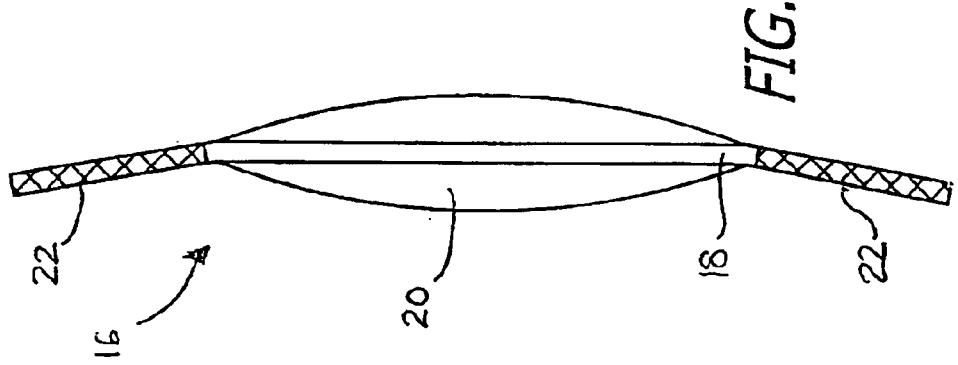
FIG. 2B is a side view of the embodiment of FIG. 2A.
Figure 2A:
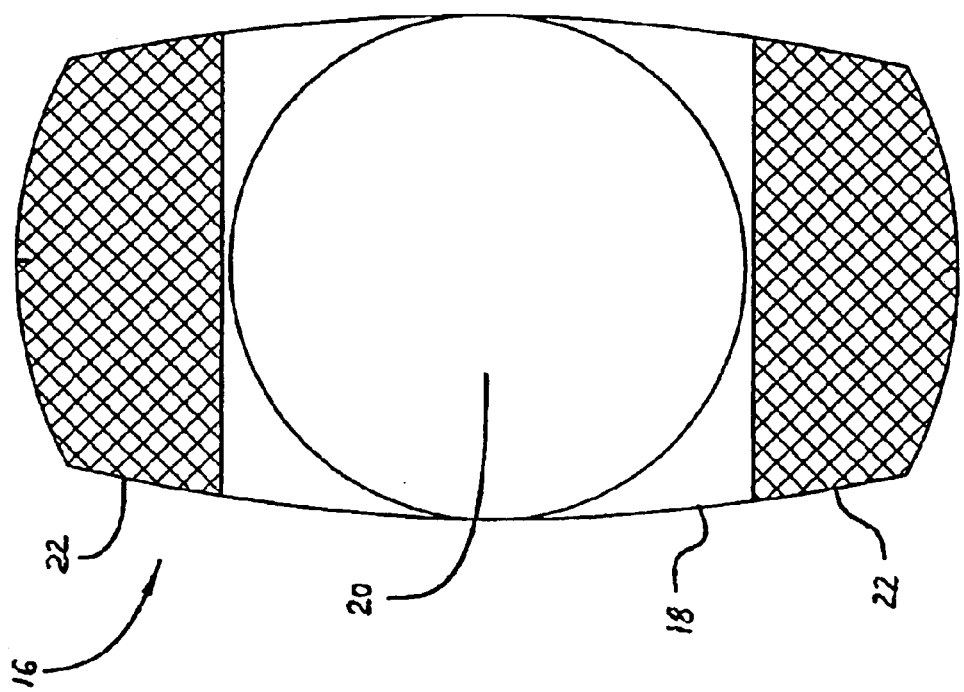
FIG. 2A is a top view of an embodiment of an intraocular lens of the present invention having an optic and a pair of plate-type haptics.

FIG. 2A depicts another embodiment of an intraocular lens of the present invention. In FIG. 2A, a plate-type haptics lens 16 having a lens body 18 is shown. As seen from the illustration in FIG. 3A, the lens body 18 has a generally rectangular shape and includes a central optic zone or optic 20 formed from a copolymer of the present invention and plate-type haptics 22 extending from diametrically opposite edges of the optic 20. FIG. 2B depicts a side-view of the plate-type haptics lens 16 shown in FIG. 2A.

In addition, the copolymers of the present invention can be used to produce other transparent objects requiring a high refractive index and an optically clear soft material.

The invention will now be further illustrated by the following examples which are intended to be illustrative and non-limiting.

Example 1

This example illustrates the preparation of the BPA monomer. In a 3000 ml round bottom flask, 300 grams of N-benzyl-N-isopropylamine and 200 grams of triethylamine were added to 900 ml of ethyl ether. While stirring and cooling the mixture with ice water, 192 grams of acryloyl chloride dissolved in 300 ml of ethyl ether were added dropwise over a period of 2.5 hours. The mixture was then stirred overnight at room temperature. The resulting organic salt was dissolved in 1500 ml of distilled water. The organic layer was then separated and washed with 500 ml of saturated sodium hydrogen bicarbonate, followed with 500 ml of distilled water. The organic layer was dried with molecular sieves or magnesium sulfate and then filtered and placed in a freezer chamber at −10° C. or less for 24 hours. After filtering, the monomer was recrystallized again with 1200 ml of ethyl ether to provide the final crystallized BPA product.

Example 2

The remaining examples illustrate the preparation of copolymers according to the present invention.

In a 1000 ml round bottom flask, 119.7 grams of n-butyl acrylate, 29.0 grams of BPA, 10.4 grams of ethylene glycol dimethacrylate, 0.96 grams of 2-[3-(2H-Benzotriazol-2-yl)-4-hydroxyphenyl]ethyl methacrylate and 0.15 grams of 2,2'-azobisisobutyronitrile were mixed. The mixture was stirred and completely purged with nitrogen gas for at least one hour, and then transferred into a glass sheet-casting fixture by filtering it through a 0.2 µl filter under high purity nitrogen atmospheric condition. The sheet-casting fixture was placed in a 75° C. oven for 16 hours to cure. Next, the sheet was post-cured for 4 hours at 140° C. After cooling to room temperature, the polymerized sheet was removed from the fixture. The resulting copolymer had an index of refraction of 1.494 at 20° C.

Example 3

In a 1000 ml round bottom flask, 118.5 grams of n-butyl acrylate, 32.0 grams of BPA, 8.0 grams of ethylene glycol dimethacrylate, 1.44 grams of 2-[3-(2H-Benzotriazol-2-yl)-4-hydroxyphenyl]ethyl methacrylate and 0.13 grams of 2,2'-azobisisobutyronitrile were mixed. The mixture was stirred and completely purged with nitrogen gas for at least one hour, and then transferred into a glass sheet-casting fixture by filtering it through a 0.2 µl filter under high purity nitrogen atmospheric condition. The sheet-casting fixture was placed in a 75° C. oven for 16 hours to cure. Next, the sheet was post-cured for 4 hours at 140° C. After cooling to room temperature, the polymerized sheet was removed from the fixture. The resulting copolymer had an index of refraction of 1.496 at 20° C.

Example 4

In a 1000 ml round bottom flask, 63.5 grams of n-butyl acrylate, 54.6 grams of n-butyl methacrylate, 31.7 grams of BPA, 9.0 grams of ethylene glycol dimethacrylate, 1.28 grams of 2-[3-(2H-Benzotriazol-2-yl)-4-hydroxyphenyl] ethyl methacrylate and 0.20 grams of 2,2'-azobisisobutyronitrile were mixed. The mixture was stirred and completely purged with nitrogen gas for at least one hour, and then transferred into a glass sheet-casting fixture by filtering it through a 0.2 µl filter under high purity nitrogen atmospheric condition. The sheet-casting fixture was placed in a 75° C. oven for 16 hours to cure. Next, the sheet was post-cured for 4 hours at 140° C. After cooling to room temperature, the polymerized sheet was removed from the fixture. The resulting copolymer had an index of refraction of 1.493 at 20° C., an elongation of 100% and a tensile strength of 680 psi.

Example 5

In a 1000 ml round bottom flask, 79.4 grams of n-butyl acrylate, 39.7 grams of n-butyl methacrylate, 31.7 grams of BPA, 7.9 grams of ethylene glycol dimethacrylate, 1.35 grams of 2-[3-(2H-Benzotriazol-2-yl)-4-hydroxyphenyl] ethyl methacrylate and 0.20 grams of 2,2'-azobisisobutyronitrile were mixed. The mixture was stirred and completely purged with nitrogen gas for at least one hour, and then transferred into a glass sheet-casting fixture by filtering it through a 0.2 µl filter under high purity nitrogen atmospheric condition. The sheet-casting fixture was placed in a 75° C. oven for 16 hours to cure. Next, the sheet was post-cured for 4 hours at 140° C. After cooling to room temperature, the polymerized sheet was removed from the fixture. The resulting copolymer had an index of refraction of 1.493 at 20° C., an elongation of 106% and a tensile strength of 405 psi.

Example 6

In a 1000 ml round bottom flask, 51.5 grams of n-butyl acrylate, 71.4 grams of n-butyl methacrylate, 23.8 grams of BPA, 12.0 grams of ethylene glycol dimethacrylate, 1.28 grams of 2-[3-(2H-Benzotriazol-2-yl)-4-hydroxyphenyl] ethyl methacrylate and 0.20 grams of 2,2'-azobisisobutyronitrile were mixed. The mixture was stirred and completely purged with nitrogen gas for at least one hour, and then transferred into a glass sheet-casting fixture by filtering it through a 0.2 µl filter under high purity nitrogen atmospheric condition. The sheet-casting fixture was placed in a 75° C. oven for 16 hours to cure. Next, the sheet was post-cured for 4 hours at 140° C. After cooling to room temperature, the polymerized sheet was removed from the fixture. The resulting copolymer had an index of refraction of 1.495 at 20° C., an elongation of 68% and a tensile strength of 460 psi.

Example 7

In a 1000 ml round bottom flask, 72.5 grams of n-butyl acrylate, 51.1 grams of n-butyl methacrylate, 23.8 grams of BPA, 10.9 grams of ethylene glycol dimethacrylate, 1.28 grams of 2-[3-(2H-Benzotriazol-2-yl)-4-hydroxyphenyl] ethyl methacrylate and 0.20 grams of 2,2'-azobisisobutyronitrile were mixed. The mixture was stirred and completely purged with nitrogen gas for at least one hour, and then transferred into a glass sheet-casting fixture by filtering it through a 0.2 µl filter under high purity nitrogen atmospheric condition. The sheet-casting fixture was placed in a 75° C. oven for 16 hours to cure. Next, the sheet was post-cured for 4 hours at 140° C. After cooling to room temperature, the polymerized sheet was removed from the fixture. The resulting copolymer had an index of refraction of 1.494 at 20° C., an elongation of 80%, a glass transition temperature (Tg) of 11° C. and a tensile strength of 920 psi.

Example 8

In a 1000 ml round bottom flask, 85.3 grams of n-butyl acrylate, 40.6 grams of ethyl methacrylate, 23.8 grams of BPA, 9.0 grams of ethylene glycol dimethacrylate, 1.28 grams of 2-[3-(2H-Benzotriazol-2-yl)-4-hydroxyphenyl] ethyl methacrylate and 0.20 grams of 2,2'-azobisisobutyronitrile were mixed. The mixture was stirred and completely purged with nitrogen gas for at least one hour, and then transferred into a glass sheet-casting fixture by filtering it through a 0.2 µl filter under high purity nitrogen atmospheric condition. The sheet-casting fixture was placed in a 75° C. oven for 16 hours to cure. Next, the sheet was post-cured for 4 hours at 140° C. After cooling to room temperature, the polymerized sheet was removed from the fixture. The resulting copolymer had an index of refraction of 1.495 at 20° C., an elongation of 115% and a tensile strength of 1300 psi.

Example 9

In a 1000 ml round bottom flask, 82.2 grams of n-butyl acrylate, 42.7 grams of ethyl methacrylate, 23.8 grams of BPA, 9.9 grams of ethylene glycol dimethacrylate, 1.3 grams of 2-[3-(2H-Benzotriazol-2-yl)-4-hydroxyphenyl]ethyl methacrylate and 0.20 grams of 2,2'-azobisisobutyronitrile were mixed. The mixture was stirred and completely purged with nitrogen gas for at least one hour, and then transferred into a glass sheet-casting fixture by filtering it through a 0.2 µl filter under high purity nitrogen atmospheric condition. The sheet-casting fixture was placed in a 75° C. oven for 16 hours to cure. Next, the sheet was post-cured for 4 hours at 140° C. After cooling to room temperature, the polymerized sheet was removed from the fixture. The resulting copolymer had an index of refraction of 1.493 at 20° C., an elongation of 110%, a glass transition temperature (Tg) of 5° C. and a tensile strength of 930 psi.

Table 1 summarizes the copolymer compositions and properties for Examples 2 through 9.

TABLE 1

| | Example #: | | | | | | | |
|---|---|---|---|---|---|---|---|---|
| | 2 | 3 | 4 | 5 | 6 | 7 | 8 | 9 |
| Composition (wt %) | | | | | | | | |
| BA | 74.8 | 74.1 | 39.7 | 49.6 | 32.2 | 45.3 | 53.3 | 51.4 |
| BMA | — | — | 34.1 | 24.8 | 44.6 | 32.2 | — | — |
| EMA | — | — | — | — | — | — | 25.4 | 26.7 |
| BPA | 18.1 | 20.0 | 19.8 | 19.8 | 14.9 | 14.9 | 14.9 | 14.9 |
| EGDMA | 6.5 | 5.0 | 5.6 | 5.0 | 7.5 | 6.8 | 5.6 | 6.2 |
| BHPEMA | 0.6 | 0.9 | 0.8 | 0.8 | 0.8 | 0.8 | 0.8 | 0.8 |
| AIBN | <0.1 | <0.1 | <0.1 | <0.1 | <0.1 | <0.1 | <0.1 | <0.1 |

TABLE 1-continued

| | Example #: | | | | | | | |
|---|---|---|---|---|---|---|---|---|
| | 2 | 3 | 4 | 5 | 6 | 7 | 8 | 9 |
| Properties | | | | | | | | |
| Refractive Index | 1.494 | 1.496 | 1.493 | 1.493 | 1.495 | 1.494 | 1.495 | 1.493 |
| Elongation (%) | — | — | 100 | 106 | 68 | 80 | 115 | 110 |
| Tg (° C.) | — | — | — | — | — | 11 | — | 5 |
| Tensile Strength (psi) | — | — | 680 | 405 | 460 | 920 | 1300 | 930 |

BA-n-butyl acrylate
BMA-n-butyl methacrylate
EMA-ethyl methacrylate
BPA-N-benzyl-N-isopropylacrylamide
EGDMA-ethylene glycol dimethacrylate
BHPEMA-2-[3-(2H-Benzotriazol-2-yl)-4-hydroxyphenyl]ethyl methacrylate
AIBN-2,2'-azobisisobutyronitrile While several specific embodiments of the invention have been illustrated and described, it will be apparent that various modifications can be made without departing from the spirit and scope of the invention. Accordingly, it is not intended that the invention be limited, except as by the appended claims.

What is claimed is:

1. An ophthalmic lens comprising:
   a hydrophobic copolymer comprising a first constituent that is a hydrophobic acrylamide monomer, wherein the hydrophobic acrylamide monomer is N-benzyl-N-isopropylacrylamide.

2. The ophthalmic lens of claim 1, wherein the N-benzyl-N-isopropylacrylamide comprises an amount of about 1 to about 50 percent by weight of the copolymer.

3. The ophthalmic lens of claim 1, wherein the N-benzyl-N-isopropylacrylamide comprises an amount of about 12 to about 25 percent by weight of the copolymer.

4. The ophthalmic lens of claim 1, wherein the copolymer further comprises a second constituent that forms copolymers having glass transition temperatures of less than about 22° C.

5. The ophthalmic lens of claim 4, wherein the second constituent is selected from the group consisting of alkyl acrylate monomers, alkyl methacrylate monomers and mixtures thereof.

6. The ophthalmic lens of claim 5, wherein the second constituent is n-butyl acrylate.

7. The ophthalmic lens of claim 5, wherein the second constituent is a mixture of n-butylacrylate and a monomer selected from the group consisting of n-butyl methacrylate and ethyl methacrylate.

8. The ophthalmic lens of claim 1, wherein the copolymer further comprises a crosslinking agent.

9. The ophthalmic lens of claim 8, wherein the crosslinking agent is selected from the group consisting of ethylene glycol diacrylate, ethylene glycol dimethacrylate, 1,3-butanediol diacrylate, 1,3-butanediol dimethacrylate, 1,4-butanediol diacrylate, 1,4-butanediol dimethacrylate, 1,6-hexanediol diacrylate, 1,6-hexanediol dimethacrylate, poly(ethylene glycol)diacrylate and poly(ethylene glycol) dimethacrylate.

10. The ophthalmic lens of claim 9, wherein the crosslinking agent is ethylene glycol dimethacrylate.

11. The ophthalmic lens of claim 1, wherein the copolymer further comprises a UV absorbing constituent selected from the group consisting of acryloyl or methacryloyl or methacrylate, or methallyl acryloyl or methacryloyl functionalized benzotriazoles and benzophenones.

12. The ophthalmic lens of claim 1, wherein the copolymer further comprises an initiating constituent selected from the group consisting of peroxide, peroxydicarbonate, azo free radical initiators and UV initiators.

13. The ophthalmic lens of claim 1, wherein the copolymer has a refractive index of at least about 1.47.

14. The ophthalmic lens of claim 1, wherein the copolymer has a glass transition temperature of at most about 5° C.

15. The ophthalmic lens of claim 1, wherein the ophthalmic lens is an intraocular lens.

16. An ophthalmic lens comprising:
   a hydrophobic copolymer including:
      a first constituent that is a hydrophobic acrylamide monomer, the hydrophobic acrylamide monomer being N-benzyl-N-isopropylacrylamide;
      a second constituent selected from the group consisting of alkyl acrylate monomers, alkyl methacrylate monomers and mixtures thereof;
      a crosslinking agent selected from the group consisting of ethylene glycol diacrylate, ethylene glycol dimethacrylate, 1,3-butanediol diacrylate, 1,3-butanediol dimethacrylate, 1,4-butanediol diacrylate, 1,4-butanediol dimethacrylate, 1,6-hexanediol diacrylate, 1,6-hexanediol dimethacrylate, poly(ethylene glycol)diacrylate and poly(ethylene glycol)dimethacrylate;
      a UV absorbing constituent selected from the group consisting of acrylate or methacrylate functionalized benzotriazoles and benzophenones; and
      an initiating constituent selected from the group consisting of peroxide, peroxydicarbonate, azo free radical initiators and UV initiators.

17. The ophthalmic lens of claim 16, wherein the N-benzyl-N-isopropylacrylamide comprises an amount of about 1 to about 50 percent by weight of the copolymer.

18. The ophthalmic lens of claim 16, wherein the N-benzyl-N-isopropylacrylamide comprises an amount of about 12 to about 25 percent by weight of the copolymer.

19. The ophthalmic lens of claim 16, wherein the second constituent is n-butyl acrylate.

20. The ophthalmic lens of claim 16, wherein the second constituent is a mixture of n-butyl acrylate and a monomer selected from the group consisting of n-butyl methacrylate and ethyl methacrylate.

21. The ophthalmic lens of claim 16, wherein the copolymer has a refractive index of at least about 1.47.

22. The ophthalmic lens of claim 16, wherein the copolymer has a glass transition temperature of at most about 5° C.

23. The ophthalmic lens of claim 16, wherein the ophthalmic lens is an intraocular lens.

24. An acrylamide copolymer comprising:
a first constituent that is a hydrophobic acrylamide monomer, the hydrophobic acrylamide monomer being N-benzyl-N-isopropylacrylamide; and
a second constituent that forms copolymers having glass transition temperatures of less than about 22° C., wherein the acrylamide copolymer is hydrophobic.

25. The copolymer of claim 24, wherein the N-benzyl-N-isopropylacrylamide comprises an amount of about 1 to about 50 percent by weight of the copolymer.

26. The copolymer of claim 24, wherein the N-benzyl-N-isopropylacrylamide comprises an amount of about 12 to about 25 percent by weight of the copolymer.

27. The copolymer of claim 24, wherein the second constituent is selected from the group consisting of alkyl acrylate monomers, alkyl methacrylates monomers and mixtures thereof.

28. The copolymer of claim 27, wherein the second constituent is n-butyl acrylate.

29. The copolymer of claim 27, wherein the second constituent is a mixture of n-butyl acrylate and a monomer selected from the group consisting of n-butyl methacrylate and ethyl methacrylate.

30. The copolymer of claim 24 further comprising a crosslinking agent.

31. The copolymer of claim 30, wherein the crosslinking agent is selected from the group consisting of ethylene glycol diacrylate, ethylene glycol dimethacrylate, 1,3-butanediol diacrylate, 1,3-butanediol dimethacrylate, 1,4-butanediol diacrylate, 1,4-butanediol dimethacrylate, 1,6-hexanediol diacrylate, 1,6-hexanediol dimethacrylate, poly(ethylene glycol)diacrylate and poly(ethylene glycol) dimethacrylate.

32. The copolymer of claim 31, wherein the crosslinking agent is ethylene glycol dimethacrylate.

33. The copolymer of claim 24 further comprising a UV absorbing constituent selected from the group consisting of acryloyl or methacryloyl, or methallyl functionalized benzotriazoles and benzophenones.

34. The copolymer of claim 24 further comprising an initiating constituent selected from the group consisting of peroxide, peroxydicarbonate, azo free radical initiators and UV initiators.

35. The copolymer of claim 24 having a refractive index of at least about 1.47.

36. The copolymer of claim 24 having a glass transition temperature of at most about 5° C.

* * * * *

UNITED STATES PATENT AND TRADEMARK OFFICE
CERTIFICATE OF CORRECTION

PATENT NO.    : 6,737,448 B2
DATED         : May 18, 2004
INVENTOR(S)   : Xiugao Liao It is certified that error appears in the above-identified patent and that said Letters Patent is hereby corrected as shown below:

<u>Column 4,</u>
Line 34, delete "WV" and insert -- UV --.

<u>Column 12,</u>
Lines 13-14, delete "bcn-zotriazoles" and insert -- ben-zotriazoles --.

Signed and Sealed this

Eleventh Day of January, 2005

JON W. DUDAS
*Director of the United States Patent and Trademark Office*